April 7, 1964 F. NETTEL 3,127,744
COMBINED STEAM TURBINE-AIR TURBINE POWER PLANTS
Filed Oct. 19, 1960
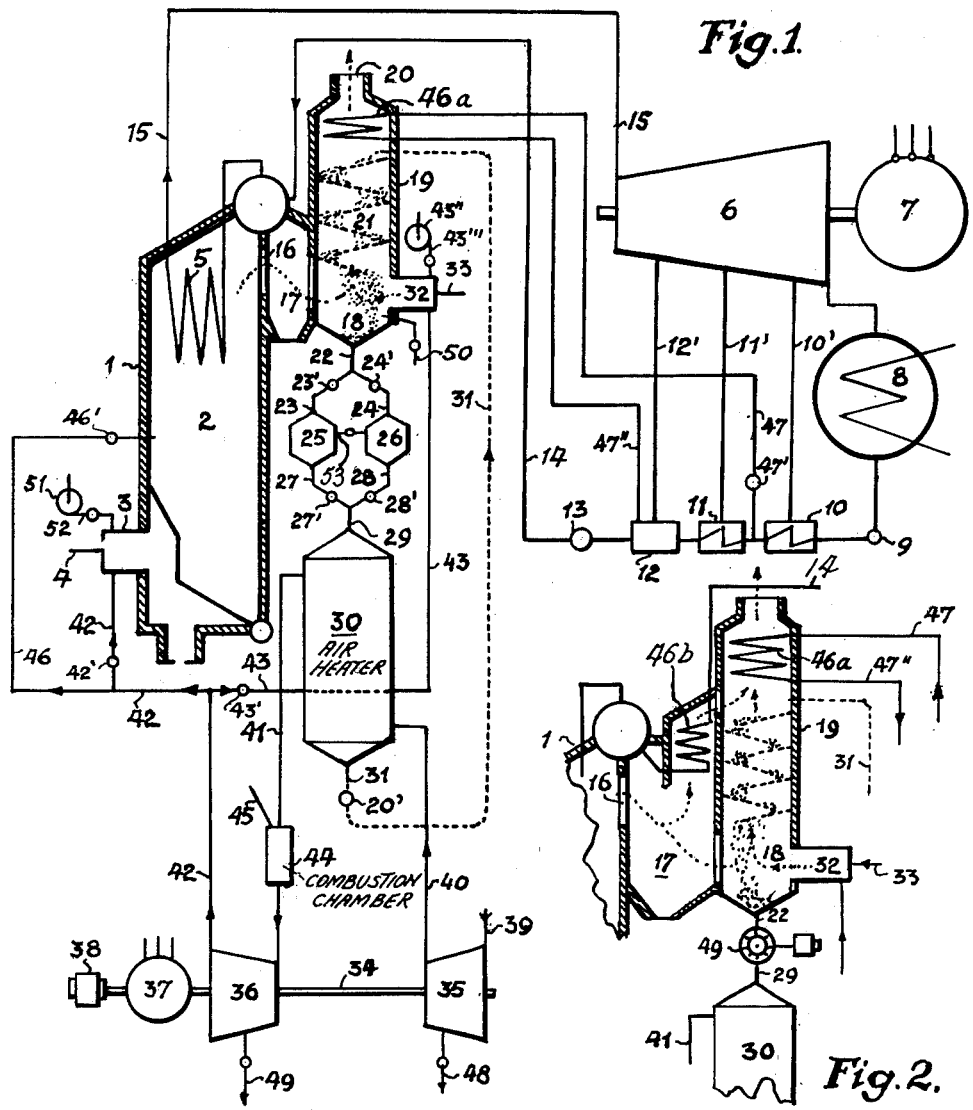
Frederick Nettel.
INVENTOR.

United States Patent Office 3,127,744
Patented Apr. 7, 1964

3,127,744
COMBINED STEAM TURBINE-AIR TURBINE
POWER PLANTS
Frederick Nettel, 173 Chapel Road, Manhasset, N.Y.
Filed Oct. 19, 1960, Ser. No. 63,560
12 Claims. (Cl. 60—49)

This invention deals with power plants comprising steam boilers and steam turbines in combination with air turbines.

Such plants using gas turbines, whose exhaust is used as combustion supporting medium in the steam boilers are known. Also known are plants in which the compressed air issuing from the compressor to the air turbine set is further heated in a surface type heat exchanger which may be a separate fuel burning unit, or which is incorporated as a special air-pass in the steam boiler proper.

In the first-mentioned plants the gas turbines are restricted to the use of oil fuels of specified characteristics to prevent difficulties in the turbine blading from corrosion. Besides, in power plants burning coal, this is generally considerably cheaper than oils. The same economic disadvantage is encountered if gas fuel has to be used for the gas turbine.

The principal object of this invention is to avoid these drawbacks and to enable combined plants to operate on any fuel without restriction, including solid fuels such as for example coals and waste heat.

It is another object of this invention to enable the steam turbine part of the plant to operate independently of the air turbine and vice versa.

It is a further object of this invention to avoid in a great measure heat transfer from the boiler gases through walls (tube or plate exchangers) by employing direct contact pebble heaters for this purpose.

These and further objects of my invention will be apparent from the following specification when taken with the accompanying drawings which show by way of non-limiting examples diagrammatically embodiments of my invention.

FIG. 1 shows an embodiment using hot air from the air turbine as combustion air in the second furnace and alternatively the supply of said air from a fan.

FIG. 2 illustrates details of a modified arrangement for moving the pebbles from the gas cooler to the air heater.

Obviously, the restriction of known combined steam turbine-gas turbine power plants to certain types of liquid fuels and/or gas fuels for the gas or air turbines makes them economically uncompetitive where such fuels are either high in price or not available. Besides, coal-burning plants where the air for the turbine is heated in tubular or plate type heaters indirectly, require for acceptable effectiveness tremendous heating surfaces and are correspondingly expensive, as well as difficult to maintain, as experience with the "air boilers" in closed-cycle air turbine plants has shown.

The principal object of this invention is achieved by reheating of the gases issuing from the steam boiler by means of a secondary gas stream produced in a secondary furnace in which fuel is burned in air supplied from the ambient atmosphere, using the mixture of the boiler gases and the gases from the secondary furnace to heat pebbles and thereafter using the hot pebbles to heat the air issuing from the air compressor before it enters the air turbine to produce useful power by expansion.

Another improvement in the economy of the plant is achieved by a modification in the supply of the combustion air to the secondary furnace, i.e., taking hot air from the exhaust of the air turbine, for both the boiler furnace and the secondary furnace.

Since no combustion products reach the air turbine, every type of fuel including coal or residual oil fuels can be burned in the combined power plant. The characteristic use according to this invention of contact type gas coolers and air heaters for heat regeneration from the boiler gases and heating of the turbine air to its required top temperature, avoids expensive surface type air heaters and restricts possible corrosion to the pebbles which are expensive in most cases.

Reverting now in more detail to FIG. 1, in which 1 denotes the steam boiler with furnace 2, fuel burner 3, fuel supply pipe 4, superheater 5. 6 is the steam turbine coupled to a power consumer, for example the electric generator 7, 8 the steam condenser, 9 the condensate pump, 10, 11, and 12 regenerative feedwater heaters fed by extraction steam pipes 10', 11', and 12' from the turbine 6. The boiler feed pump 13 feeds preheated boiler feed water back to the steam boiler drum via the pipe 14 while live steam is supplied to the turbine via the pipe 15 in the conventional manner. 16 is the outlet conduit for the boiler gases from the boiler proper which is connected via conduit 17 to a secondary furnace 18 arranged at the lower end of the gas cooler 19 which discharges the gases at its top end 20 to the stack.

The gas cooler is of the contact type, using pebbles of suitable material as heat carrier. These pebbles enter cold through the pipe 31 and fall in multiple cascades over baffles or other obstacles 21 downward in counterflow to the hot gases thereby cooling same and being in turn heated themselves.

From the bottom of the secondary furnace 18 the pebbles flow through the pipe 22 and branch pipes 23 and 24, with valves 23' and 24' respectively, into the sluice chambers 25 and 26, leaving through the branch pipes 27 and 28, with valves 27' and 28' and pipe 29, to enter the air heater 30. This heater is basically of the same design as the gas cooler 19, but serving to heat compressed air in counterflow to the falling pebbles, cooling the latter in turn, as will be explained later. The cooled pebbles are discharged at the bottom and led through the pipe 31 back into the gas cooler 19, in a substantially closed circuit.

Connected to the secondary furnace 18 is a secondary fuel burner 32 with fuel inlet pipe 33. Further an air turbine set 34, consisting of an air compressor 35, an air turbine 36, a generator or other power consumer 37 and a starter motor 38 of any known kind, all arranged on one common shaft, is provided near the boiler. The compressor takes air from the ambient atmosphere at 39, discharges it into the air heater 30 by means of the conduit 40; the air leaves 30 near its top to enter the air turbine through the conduit 41. After expansion in the turbine the still hot exhaust is discharged through conduit 42 into the fuel burner 3 and ultimately the boiler furnace 2. A valve 42' is interposed in the conduit 42. Branched off the conduit 42 is a conduit 43, with valve 43', which leads to the secondary burner 32, and ultimately into the secondary furnace 18. A tertiary fuel burning combustion chamber 44 with fuel inlet pipe 45 is interposed in conduit 41, as shown.

Arranged between the pebble inlet into the gas cooler 19 through the pipe 31 and the gas outlet at 20, is a low temperature economizer, also known by the term stack gas cooler 46a, which is fed with feedwater, branched off between the heaters 10 and 11, via pipe 47 through the auxiliary feedwater pump 47'. Heated feedwater is returned to the feedwater heater 12 via pipe 47".

The plant is started and operated as follows:

With valve 43' closed, the starting motor 38 is energized to rotate the set 34. An air stream is thereby created from 39 through 35, 40, 41, 44, 36 and 42 into the boiler and thence through 16, 17, 18, 19 and 20 to the atmosphere. Fuel is then fed into 44 and ignited, enabling the set 34 to operate as a Brayton cycle gas turbine. Hot exhaust from the turbine 36, which still contains much free oxygen, reaches the burner 3, into which fuel can be fed through 4 and ignited. Steam can now be generated and fed through pipe 15 to the steam turbine. With boiler gases issuing from 16, pebbles are fed into 19 from pipe 20 in which a pumping device 20′ of any kind may be interposed. The boiler gases, flowing upwards through 19, heat the pebbles while they fall. Now the valve 43′ is opened, permitting hot air to reach the secondary burner 32, in which fuel from the pipe 33 is ignited. The resulting combustion gases mix in the furnace 18 with the boiler gases entering through 17, reheating them to such a temperature as is necessary to enable them to heat the pebbles to a higher temperature than the air temperature required at the entrance to the turbine 36.

These very hot pebbles enter the sluice chamber 25 through the open valve 23′ and fill it; after that the valve 23′ is closed and valve 24′ opened causing the chamber 26 to be filled. If now the valve 27′ is opened, the chamber 25 is pressurized from the air heater 30, and hot pebbles will fall into 30, meeting therein compressed air entering through 40 and leaving through 41 which begins to be heated. With very hot air now reaching the turbine via conduit 41 and the combustion chamber 44, the fuel feed to latter can be put out of operation, and the set 34 will continue to run as air turbine set. The valves 23′, 24′, 27′ and 28′ are operated in rythmic sequence so that the chambers 25 and 26 are filled and emptied in sequence. These chambers, while basically operating as sluice chambers, can be used as heat accumulators if their volume is large enough to store pebbles needed for the operation of the plant for a desired time interval, from below one minute to an hour or more.

With this cyclic procedure compressed air corresponding to the volume of one of the chambers would be lost to the power cycle with each changeover. To reduce this loss, a valved cross conduit 53 is provided between the chambers 25 and 26, so that the pressure can be equalized in both chambers before one of the chambers is connected to the air heater 30.

The combustion gases generated in 32 do not reach the turbine, which is normally a pure air turbine. Any kind of fuel can therefore be burned also in 32.

If the boiler has to operate at partial load, requiring less air at the burner 3, surplus air can be fed into the boiler furnace through a bypass conduit 46 with valve 46′ as secondary air. The reduction in plant efficiency thereby is very small.

Instead of supplying hot air from the air turbine 36 to the secondary furnace 32 via the conduit 43, it is possible to furnish fresh air from a fan 43″, connected to the secondary furnace 32 and burner 33 by the valved conduit 43‴.

As shown in FIG. 2, which illustrates details of a modified gas cooler and air heater arrangement, the chambers 25 and 26, together with their valves may be omitted. In this case the pipe 22 is connected to a pebble pump 49 from which the pebbles discharge directly into the pipe 29. This pump may be designed as rotary cellular feeder as known per se driven by a motor of any kind, as screw feeder or other mechanical devices known for other similar purposes. Since the air heater 30 works under pressures generally from about 3 to 6 atmospheres, this pressure may be utilized to lift the pebbles from 30 back to 19 by what is known is "dense phase" lift. However, other lifting devices 20′ such as bucket elevators, screw elevators for examples may be utilized.

Instead of producing mechanical power by the set 34, it is possible to produce compressed air wholly or partly as useful energy product. This may be done by tapping compressed air from the compressor 35 through a valved conduit 48, or hot air from the turbine 36 through the valved conduit 49 for use in an outside consumer. If hot waste heat gases are available from an outside source, they may be fed into the furnace 18 through a valved conduit 50, as shown in FIG. 1.

In combined plants as described above, it is often desirable to operate either the steam part or the air turbine part by itself. To operate the steam part by itself, the valves 42′ and 43′ are kept closed. Pebble flow is stopped and combustion air to the boiler is supplied by a separate forced draft fan 51, (see FIG. 1), connected via a valved conduit 52 to the burner 3. The gas flow is unchanged via 17, 18, 19 and 20, while the secondary burner 32 is out of operation. FIG. 2 shows also an economizer 46b interposed in pipe 14 in a gas stream parallel to that through 19. This may be used, for example, if the steam part of the plant works alone.

If, conversely, the air turbine part shall operate independently under special conditions, the valve 42′ is closed, but the valve 43′ kept open. The starting of the air turbine set is done in exactly the same manner as described for the combined plant, however now all turbine exhaust flows via conduit 43 to the secondary burner 32 and furnace 18, which is the only source of heat after the set 34 has been started. The hot air turbine exhaust is further heated by fuel burned in 32, enabling the pebbles to be heated to a very high temperature. The pebbles continue to flow in the same manner as described for the combined plant, heat the air in front of the turbine to the required top temperature, enabling it to work at full load. As can be seen, the gas cooler 19 serves to regenerate the heat contained in the turbine exhaust, which results in high efficiency for this kind of operation.

The plant according to this invention can be used both for stationary as well as marine power plants. For ship application the air turbine output may be partly or wholly used for ship propulsion, normally simultaneously with the steam turbine. Under special conditions, when only a small portion of the propulsive power is needed, for example maneuvering, port operation, canal operation, the air turbine alone may be used, which may result in better fuel economy. Such operation is of special significance in naval vessels, which operate for most of their useful life at 10 to 20 percent propulsion power.

It is immaterial for the purposes of this invention what particular types of contact type gas coolers and air heaters are employed and how many of each, what types and how many air compressors and air turbines are used arranged on one or several shafts. It is also immaterial what kind and size of pebbles are employed, what types of steam boilers, steam turbines, furnaces and burners are employed and what kind of fuel is burned in the plant.

Having now described and illustrated embodiments of my invention, I wish it to be understood that my invention is not limited to the specific forms and arrangements herein described and shown, or specifically covered by my claims.

I claim:
1. In a power plant using solid granular material as heat carrier, comprising the combination of: steam boiler means with first fuel burner means and furnace, steam turbine means connected to said boiler means for producing useful power, air turbine means consisting of rotary compressor means wherein air is compressed, turbine means driven by expansion of air from said compressor means, said turbine means being coupled with said compressor means so as to drive same and to produce useful power,
    first conduit means for connecting the intake of said compressor means to the ambient atmosphere,
    second conduit means for connecting the outlet of the compressor means to the inlet of said air turbine means,
    third conduit means for connecting the exhaust port of said air turbine means with said first fuel burner means and first furnace of said steam boiler means, granular material, contact type gas cooler means for cooling the gases issuing from the steam boiler means by contact heat transfer to said granular material thereby heating the latter, fourth conduit means for the combustion gases issuing from said steam boiler means for leading them into said gas cooler means, fifth conduit means for leading the cooled gases from said cooler to the ambient atmosphere, second fuel burner means and furnace connected to said gas cooler means, sixth conduit means for connecting said second burner means and furnace with said third conduit means for supplying combustion air to said second fuel burner means and furnace, contact type air heater means interposed in said second conduit means, first pipe means for the heated granular material issuing from said gas cooler means for connecting the latter to said contact type air heater means for heating the air issuing from said compressor means while cooling the granular material, second pipe means for leading said cooled granular material issuing from said air heater means back into said gas cooler means in a substantially closed circuit.

2. A power plant as set forth in claim 1, having valve means interposed in said first pipe means.

3. Power plant as set forth in claim 1, having at least two sluice chambers for the pebbles each with valves at both ends, interposed in said first pipe means, for controlling the pebble flow from said gas cooler means to said air heater means in cyclic sequence via one chamber and then via another chamber.

4. Power plant as set forth in claim 3, each of said sluice chambers having a volume to store at least such a quantity of pebbles as are needed under normal load conditions of the power plants during at least five minutes so as to serve as heat accumulators.

5. Power plant as set forth in claim 1, having pumping means for the said pebbles interposed in said first pipe means for moving said pebbles into said air heater against higher pressure prevailing in the latter.

6. Power plant as set forth in claim 1, having fuel burning combustion chamber means interposed in said second conduit means.

7. Power plant as set forth in claim 1, having surface type boiler feedwater heating means interposed in said fifth conduit means.

8. Power plant as set forth in claim 1, having valve means interposed in said third conduit means for disconnecting the first burner and first furnace means, to operate the air turbine alone, while the boiler means and the steam turbine means are out of action.

9. Power plant as set forth in claim 1, having a pumping device for the pebbles interposed in said second pipe means for transporting said pebbles issuing from said air heater means back to said gas cooler means.

10. Power plant as set forth in claim 1, having valve means interposed in said third conduit means for disconnecting the first and second burner and furnace means from said air turbine, and forced draft fan means for supplying combustion air into said first burner and furnace means, for operating the steam plant alone while the air turbine means are closed down.

11. Power plant as set forth in claim 1, having valved conduit means branched off at an intermediate stage of the rotary compressor for supplying compressed air for a consumer external to the power plant.

12. A power plant as set forth in claim 1, having valved conduit means branched off the air turbine at an intermediate stage of expansion for supplying hot compressed air for a consumer external to the power plant.

References Cited in the file of this patent

UNITED STATES PATENTS

| | | |
|---|---|---|
| 1,904,153 | Lucke | Apr. 18, 1933 |
| 2,298,663 | Traupel | Oct. 13, 1942 |
| 2,454,358 | Traupel | Nov. 23, 1948 |
| 2,477,184 | Imbert et al. | July 26, 1949 |
| 2,486,201 | Karrer | Oct. 25, 1949 |

FOREIGN PATENTS

| | | |
|---|---|---|
| 563,847 | Great Britain | Aug. 31, 1944 |

OTHER REFERENCES

German application, 1,032,766, printed June 26, 1958, (Kl. 17f 12/07); 3 pages spec., 1 sht. dwg.